US010719706B1

(12) United States Patent
Nicotera et al.

(10) Patent No.: US 10,719,706 B1
(45) Date of Patent: Jul. 21, 2020

(54) SYSTEMS AND METHODS FOR NESTED AUTOENCODING OF RADAR FOR NEURAL IMAGE ANALYSIS

(71) Applicant: ARCHITECTURE TECHNOLOGY CORPORATION, Eden Prairie, MN (US)

(72) Inventors: Paul Nicotera, Eden Prairie, MN (US); Robert Joyce, Eden Prairie, MN (US); Judson Powers, Eden Prairie, MN (US); Daniel McArdle, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 71 days.

(21) Appl. No.: 16/012,624

(22) Filed: Jun. 19, 2018

(51) Int. Cl.
*G06K 9/00* (2006.01)

(52) U.S. Cl.
CPC ....... *G06K 9/0063* (2013.01); *G06K 9/00637* (2013.01); *G06K 9/00651* (2013.01); *G06K 9/00657* (2013.01); *G06T 2207/10032* (2013.01); *G06T 2207/30181* (2013.01); *G06T 2207/30188* (2013.01)

(58) Field of Classification Search
CPC ............. G06K 9/0063; G06K 9/00637; G06K 9/00657; G06K 9/00651; G06T 2207/10032; G06T 2207/30181; G06T 2207/30188
See application file for complete search history.

(56) References Cited

U.S. PATENT DOCUMENTS

2018/0260706 A1* 9/2018 Galloway ................ G06N 3/08

OTHER PUBLICATIONS

Yao et al, "Semantic Annotation of High-Resolution Satellite Images via Weakly Supervised Learning", 2016, IEEE Transactions on Geoscience and Remote Sensing, vol. 54, No. 6, pp. 3660-3671 (Year: 2016).*
ATC-NY, NGA172-004, M172-004-0013, Phase I SBIR Proposal, "NARNIA: Nested Autoencoding of Radar for Neural Image Analysis", Jul. 20, 1017, 14 pages.

* cited by examiner

*Primary Examiner* — David F Dunphy
(74) *Attorney, Agent, or Firm* — Foley & Lardner LLP

(57) ABSTRACT

Disclosed herein are embodiments of systems, methods, and products comprise an analytic server, which provides a terrain segmentation and classification tool for synthetic aperture radar (SAR) imagery. The server accurately segments and classifies terrain types in SAR imagery and automatically adapts to new radar sensors data. The server receives a first SAR imagery and trains an autoencoder based on the first SAR imagery to generate learned representations of the first SAR imagery. The server trains a classifier based on labeled data of the first SAR imagery data to recognize terrain types from the learned representations of the first SAR imagery. The server receives a terrain query for a second SAR imagery. The server translates the second imagery data into the first imagery data and classifies the second SAR imagery terrain types using the classifier trained for the first SAR imagery. By reusing the original classifier, the server improves system efficiency.

20 Claims, 13 Drawing Sheets

SYSTEMS AND METHODS FOR NESTED AUTOENCODING OF RADAR FOR NEURAL IMAGE ANALYSIS

TECHNICAL FIELD

This application relates generally to methods and systems for advanced image segmentation for radar imagery.

BACKGROUND

Traditional methods on segmentation and classification of synthetic aperture radar (SAR) imagery may have failed to take advantage of nuances of the complex data; instead, they have only focused on detected imagery. As a result, imagery segmentation systems in traditional methods require human intervention to clean up boundaries or verify correctness. Since segmentation is a prerequisite for terrain classification, these early segmentation errors propagate downstream. Consumers of classified terrain regions, such as automated target recognition (ATR), may miss crucial search areas. The traditional methods may not be resilient against noisy or distorted inputs.

Furthermore, the traditional methods of segmentation and classification of SAR imagery may not be adaptable to new radar instrumentation. It is common for machine learning systems to require days or weeks of training before beginning to produce accurate results. Once the system has been trained on the data from one sensor, adapting to a new sensor will commonly require another large batch of labeled training data. Depending on circumstances, this training data may not exist or may be prohibitively expensive.

SUMMARY

What is therefore desired is to have a fast, accurate, and adaptable radar imagery segmentation and classification system in order to enhance intelligence-gathering capability and improve efficiency. Embodiments disclosed herein solve the aforementioned problems and other problems by developing Nested Autoencoding of Radar for Neural Image Analysis (NARNIA), a terrain segmentation and classification tool for SAR imagery based on deep learning neural networks with an innovative nested autoencoder structure. The NARNIA system applies neural networks to the problem of identifying terrain types in SAR, a novel arrangement of autoencoders enables NARNIA to quickly and cheaply adapt to data from a new sensor system. The NARNIA system may filter out irrelevant imagery from different types of radar sensors and select only the imagery that is relevant to an Automated Target Recognition (ATR) search.

In one embodiment, a computer implemented method comprises receiving, by a computer, a first imagery from a first sensor device, wherein the first imagery comprises an unlabeled dataset containing original imagery data obtained by the first sensor device; training, by the computer, an autoencoder by performing unsupervised learning on the unlabeled dataset of the first imagery to generate learned representations of the first imagery; training, by the computer, a classifier by performing supervised learning on a labeled dataset of the first imagery, wherein the labeled dataset comprises terrain types data of the first imagery, wherein the classifier is configured to determine terrain types based on the learned representations of the first imagery; translating, by the computer, a second imagery from a second sensor device into the learned representations of the first imagery; determining, by the computer, terrain types in the second imagery using the classifier trained for the first imagery, wherein the classifier segments and classifies the second imagery based on the translated learned representations of the first imagery; and displaying, by the computer, the terrain types in the second imagery on a graphical user interface.

In another embodiment, a system comprises a first sensor device; a second sensor device; a server in communication with the first and second sensor devices and configured to: receive a first imagery from the first sensor device, wherein the first imagery comprises an unlabeled dataset containing original imagery data obtained by the first sensor device; train an autoencoder by performing unsupervised learning on the unlabeled dataset of the first imagery to generate learned representations of the first imagery; train a classifier by performing supervised learning on a labeled dataset of the first imagery, wherein the labeled dataset comprise terrain types data of the first imagery, wherein the classifier is configured to determine terrain types based on the learned representations of the first imagery; translate a second imagery from a second sensor device into the learned representations of the first imagery; determine terrain types in the second imagery using the classifier trained for the first imagery, wherein the classifier segments and classifies the second imagery based on the translated learned representations of the first imagery; and display the terrain types in the second imagery on a graphical user interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
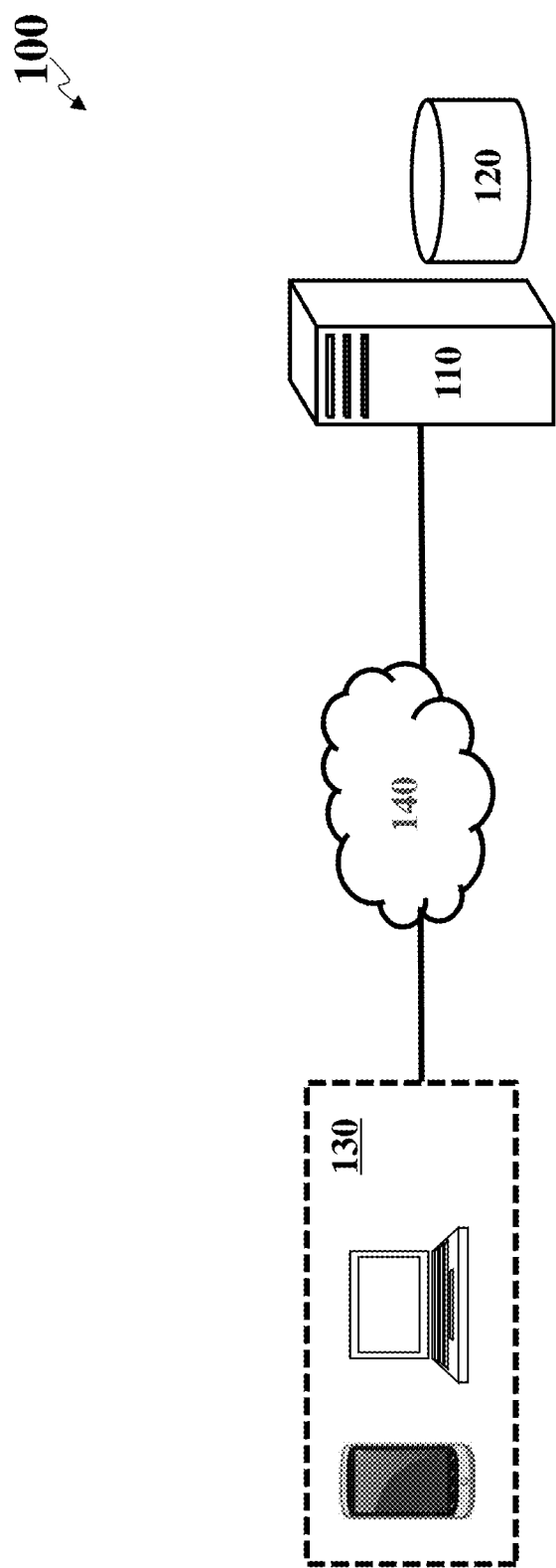
FIG. 1 illustrates a computer system for image segmentation and classification for radar imagery, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The analytic server develops nested autoencoding of radar for neural image analysis (NARNIA). By executing NARNIA, the analytic server provides an interface for filtering SAR imagery by terrain type and a terrain segmentation and classification tool for synthesis aperture radar (SAR) imagery. The analytic server accurately segments and classifies terrain in SAR imagery and can automatically adapt to new radar sensors with unlabeled training data. As an imagery filter, NARNIA can improve the efficiency of targeted systems by eliminating irrelevant data in a first path. Possible applications include intelligence, surveillance, reconnaissance (ISR), automated target recognition (ATR), attention focusing systems, and automated detection systems.

The analytic server receives a first SAR imagery and trains an autoencoder based on the first SAR imagery. The analytic server uses the autoencoder to generate learned representations of the first SAR imagery for the purpose of dimensionality reduction. The analytic server trains a classifier based on labeled data of the first SAR imagery data to recognize specific terrain types from the learned representations of the first SAR imagery. The analytic server receives a terrain query for a second SAR imagery from a client computing device. The analytic server translates the second imagery data into the first imagery data. The analytic server segments and classifies the second SAR imagery using the classifier trained using labeled data on the first SAR imagery. By reusing the original terrain classifier trained for first sensor to determine the terrain types of second sensor, the analytic server improves the system efficiency.

FIG. 1 illustrates components of a system 100 for image segmentation for radar imagery, according to an embodiment. The system 100 may include an analytic server 110 with a database 120, a set of client computing devices 130. The analytic server 110 may connect with the client computing devices 130 via hardware and software components of one or more networks 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to build NARNIA. The analytic server 110 may be logically and physically organized within the same or different devices or structures, and may be distributed across any number of physical structures and locations (e.g., cabinets, rooms, buildings, cities). The analytical server 110 may receive a request from the client computing device 130 to segment and classify SAR imagery. The analytic server 110 may develop nested autoencoding of radar for neural image analysis (NARNIA), a terrain segmentation and classification tool for SAR imagery. The analytic server 110 may train an artificial intelligence model that comprises the NARNIA tool. Specifically, the analytic server 110 may develop NARNIA based on deep learning neural networks with an innovative nested autoencoder structure. The analytic server 110 may train the artificial intelligence model or develop the NARNIA in two phases. In the first phase, the analytic server 110 may train an autoencoder by performing unsupervised learning. The autoencoder may create reduced dimensionality representations, called learned representations, of the input SAR data. In the second phase, the analytic server 110 may train a classifier by performing supervised learning to recognize specific terrain types from the learned representations. In the supervised learning step, the analytic server 110 may use training data with labeled terrain segments, train a classifier to map the learned representations to class values (e.g., terrain types). The analytic server 110 may automatically adapt to varying image quality and other challenges and may be adaptable to a radar imagery from a variety of systems.

The database 120 may be any non-transitory machine-readable media associated with the analytic server 110. The database 120 may be configured to store data, including input SAR imagery data, an artificial intelligence model comprising an autoencoder for unsupervised learning and a classifier based on supervised learning, unlabeled data, labeled data. The database 120 may also include any other intermediate data, such as learned representations, for the artificial intelligence model.

The client computing device 130 may be any computing device allowing a client to interact with the analytic server 110. The client computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The client computing device 130 may comprise any number of input and output devices supporting various types of data, such as text, image, audio, video, and the like. The client computing device 130 may issue a request to segment and classify one or more SAR imageries, and transmit relevant inputs and user parameters to the analytic server 110.

Figure 2:
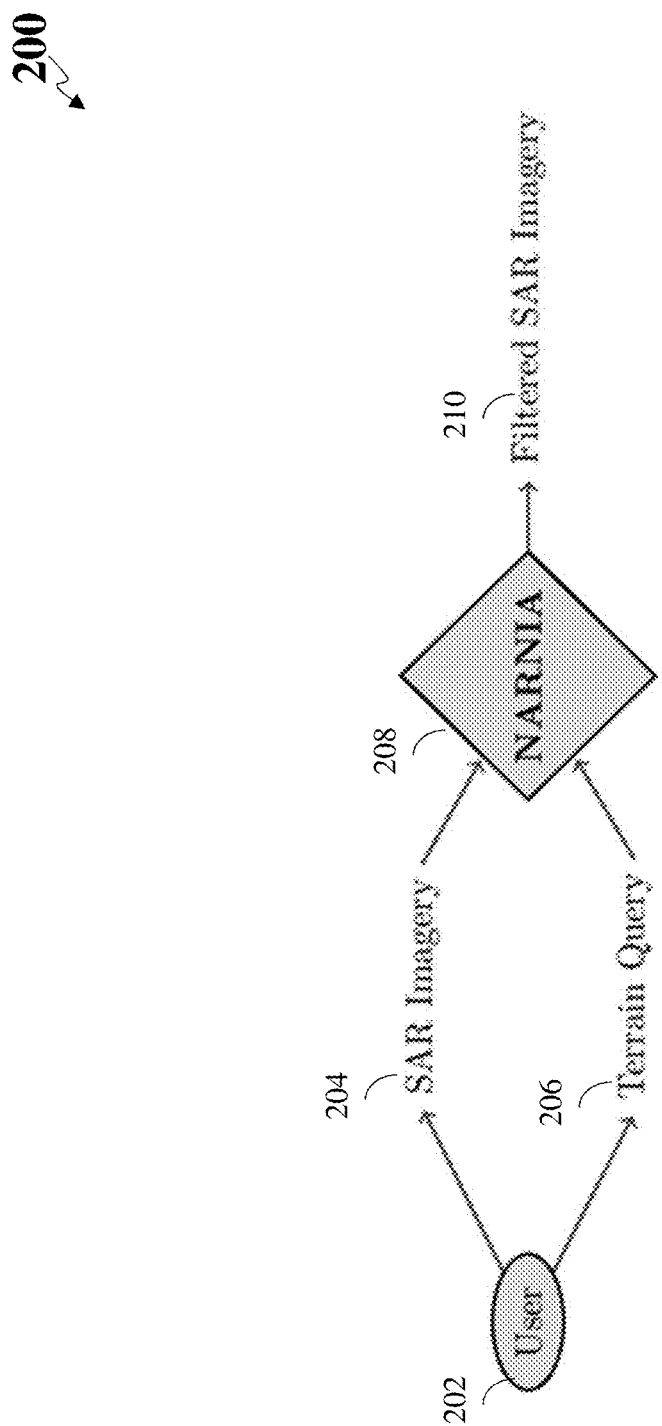
FIG. 2 illustrates a workflow for filtering SAR imagery for specific terrain types with NARNIA, according to an embodiment.

FIG. 2 illustrates a workflow for filtering SAR imagery for specific terrain types with NARNIA, according to an embodiment. A user 202 operating the client computing device may issue a request comprising a SAR imagery 204 and a terrain query 206 that requests the analytic server to segment and classify terrain types in the SAR imagery. In operation, the analytic server may provide and display an interactive user interface on the client computing device.

The user interface may allow the user to upload the one or more SAR imageries for terrain classification query. After the analytic server receives the query from the client computing device, the analytic server may apply the NARNIA 208 tool on the received SAR imagery, segment and classify different types of terrain in the SAR imagery, and output the filtered SAR imagery 210. The analytic server may display the output filtered SAR imagery on the client computing device. By filtering the imagery, the analytic server may improve the accuracy and efficiency of more intensive operations, such as automated target detection algorithm searching for cars in urban areas.

Figure 3:
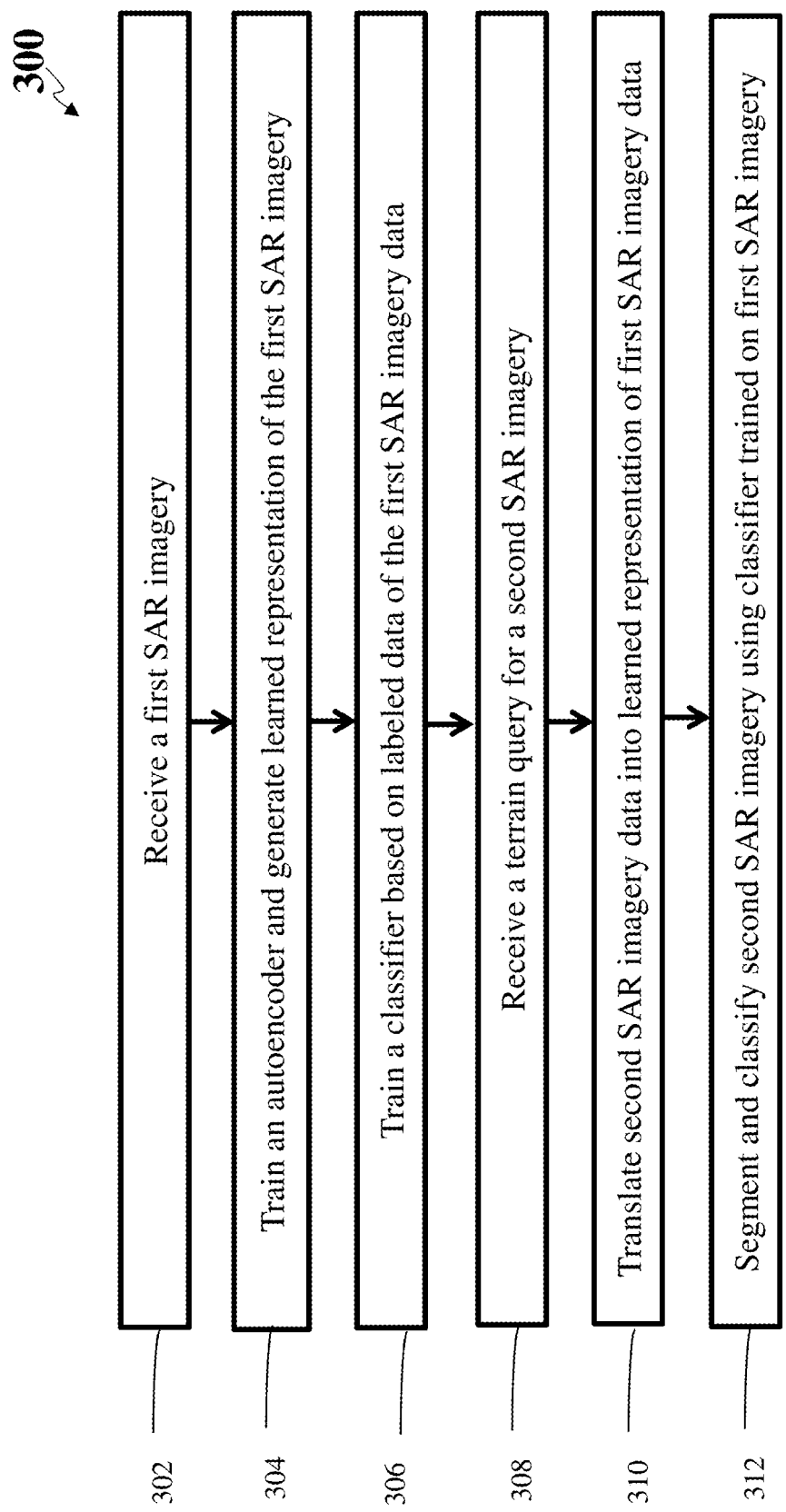
FIG. 3 illustrates a flowchart depicting operational steps for image segmentation and classification for radar imagery, according to an embodiment.

FIG. 3 illustrates a flowchart depicting operational steps for image segmentation and classification for radar imagery, according to an embodiment. Other embodiments may comprise additional or alternative steps, or may omit some steps altogether.

At step 302, the analytic server may receive a first SAR imagery from the client computing device or retrieve the first SAR imagery from the database. The first SAR imagery input may be taken by a radar sensor, for example, sensor S. The analytic server may use the first SAR imagery data to train the NARNIA tool, which is an artificial intelligence model used to segment and classify new SAR imageries. The first SAR imagery may comprise unlabeled input SAR dataset.

Figure 4:
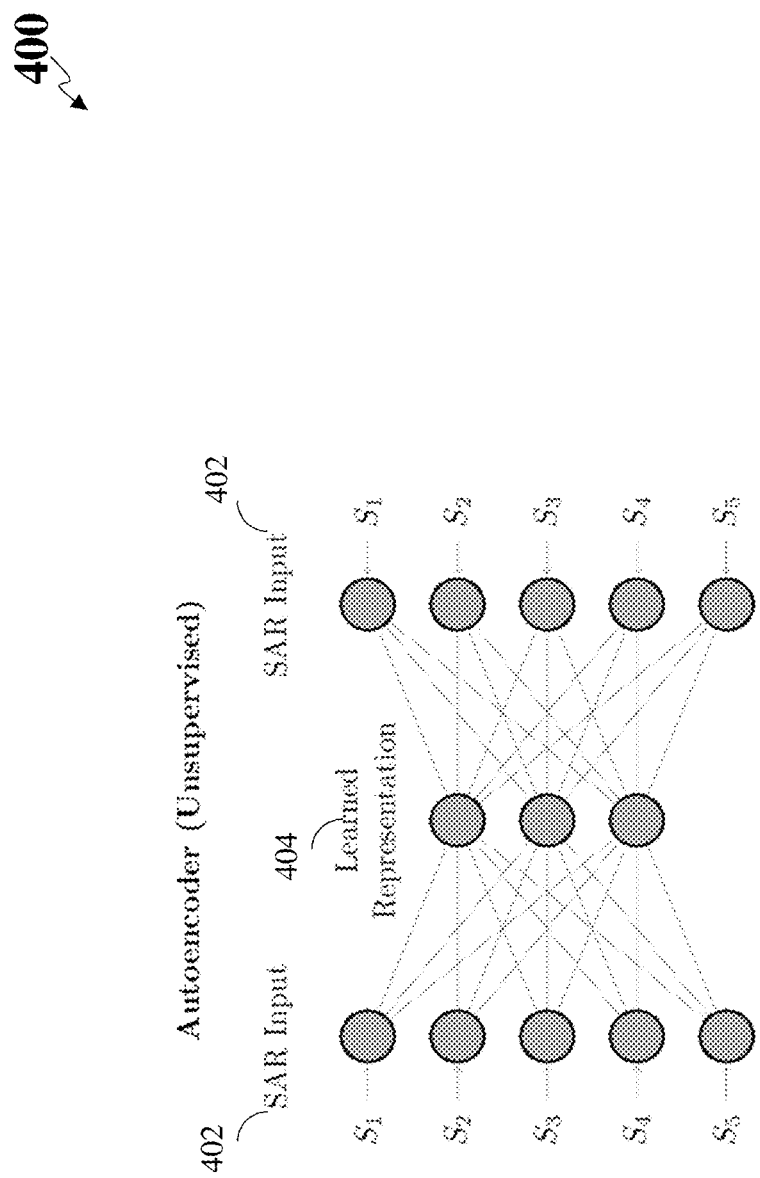
FIG. 4 illustrates an example of autoencoder performing unsupervised learning to generate learned representations, according to an embodiment.

At step 304, the analytic server may train an autoencoder and generate learned representations of the first SAR imagery using the autoencoder. The autoencoders are a common type of neural network that is trained to make its output match its input. Critically, there is a hidden layer with fewer dimensions in the output than the input. The output is called learned representations. The autoencoder approach to dimensionality reduction is capable of making non-linear discriminations, provided there are a sufficient number of hidden layers. The analytic server may apply the autoencoder to perform unsupervised learning over unlabeled input SAR data (e.g., the first SAR imagery data from sensor S). Unlabeled training data is simply data obtained by using the radar sensors, which is relatively easy to gather. The autoencoder may generate a reduced dimensionality representation, learned representations, of the input SAR data. FIG. 4 illustrates an example of autoencoder performing unsupervised learning to generate learned representations.

Figure 5:
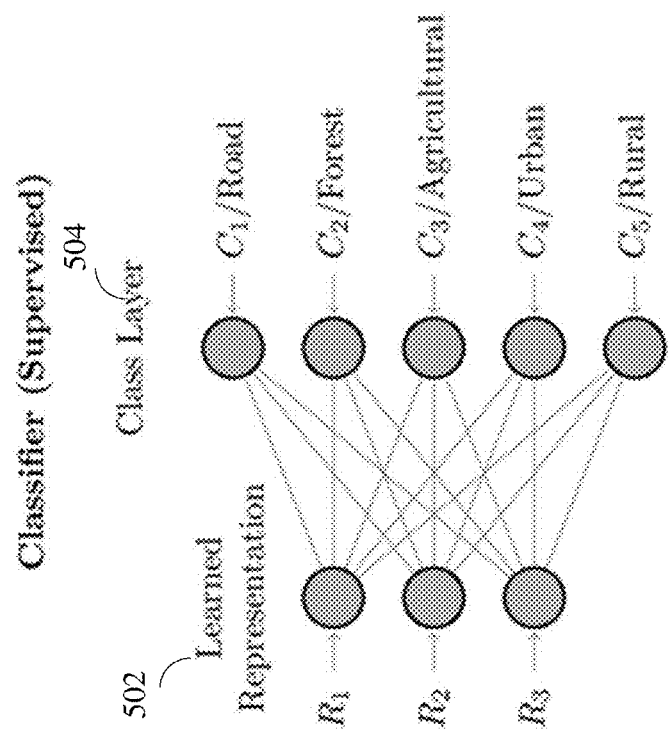
FIG. 5 illustrates an example of classifier based on supervised learning that maps learned representations to class values, according to an embodiment.

At step 306, the analytic server may train a classifier based on labeled data of the first SAR imagery data. The analytic server may use the classifier to recognize specific terrain types from the learned representations of the first SAR imagery. The analytic server may conduct a supervised learning to train the classifier using training data with labeled terrain segments. In other words, the analytic server may require a batch of labeled training data on the first SAR imagery's terrain segments to train the classifier. The first imagery may comprise a labeled training dataset that labels the terrain types in the first imagery. The classifier may map the learned representations to class values. The class values may be the returned terrain types, such as road, forest, agricultural area, urban area, rural area, and the like. The classifier may user a deep neural network with many hidden layers. The learned representations may have many more dimensions than the number of terrain classes. Training of the classifier may require large amounts of labeled training data in order to reach its full potential. FIG. 5 illustrates an example of classifier based on supervised learning that maps learned representations to class values.

At step 308, the analytic server may receive a terrain query for a second SAR imagery from the client computing device. The second SAR imagery data may be from a different sensor, for example, sensor T. Different radar sensors may have images with varying image quality and/or different environmental conditions. Once the system has been trained on the data from one sensor, adapting to a new sensor may commonly require another large batch of labeled training data. Depending on circumstances, such training data may not exist or may be prohibitively expensive. To improve the system efficiency and reduce the computing cost for SAR data from new sensor types, the analytic server may use unsupervised learning to adapt to new types of radar sensors while reusing the original terrain classifier and effectively transfer the preexisting knowledge about SAR imagery to the new sensor type.

At step 310, the analytic server may map or translate the second SAR imagery data into the learned representations of the first SAR imagery data. To grant the ability to adapt to new types of radar sensors (e.g., from sensor S to new sensor T) rapidly without requiring labeled training data, the analytic server may perform unsupervised learning on unlabeled training data of sensor T's SAR data.

Figure 6:
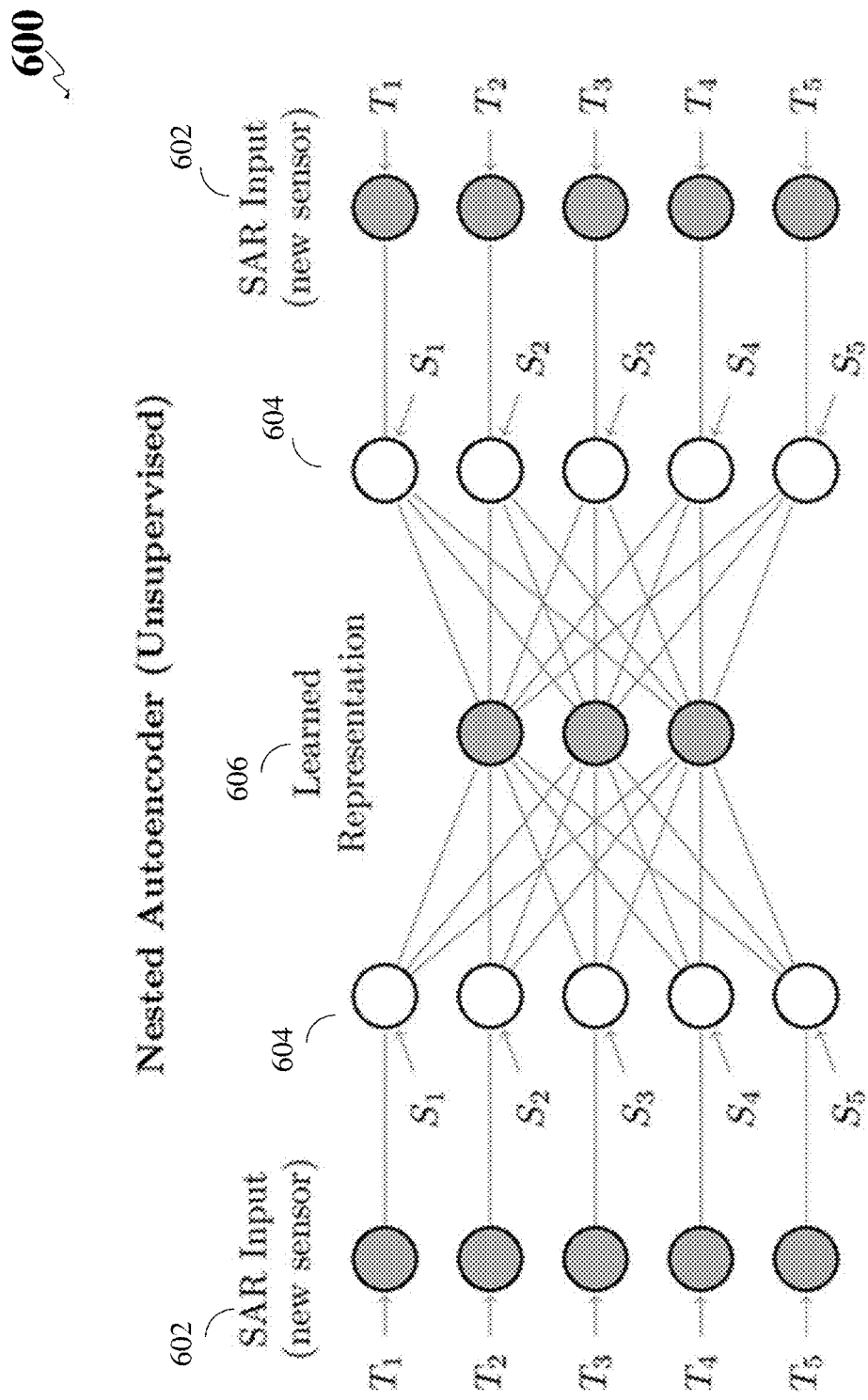
FIG. 6 illustrates an example of a nested autoencoder translating new sensor data into the learned representations of the original instrumentation, according to an embodiment.

In some embodiments, the analytic server may use the autoencoder for sensor S (e.g., S autoencoder) and place the autoencoder for sensor S in the middle of a new autoencoder for sensor T (e.g., T autoencoder). The weight of the S autoencoder are fixed to their original values. The analytic server may train the T autoencoder to reproduce the input for the S autoencoder. In this step, the analytic server may employ the neural network to learn how to cast T in terms of S's learned representations. If there are only linear differences between the data returned by sensors S and T, the analytic server may need only a single layer, which enables this step to be performed much more rapidly than the original training. After translating T data into learned representations of S data, the analytic server may reuse the original terrain classifier, effectively transferring the preexisting knowledge about SAR imagery to the new radar sensor (e.g., sensor T) type. FIG. 6 illustrates an example of translating new sensor data into the learned representations of the original instrumentation.

Figure 7:
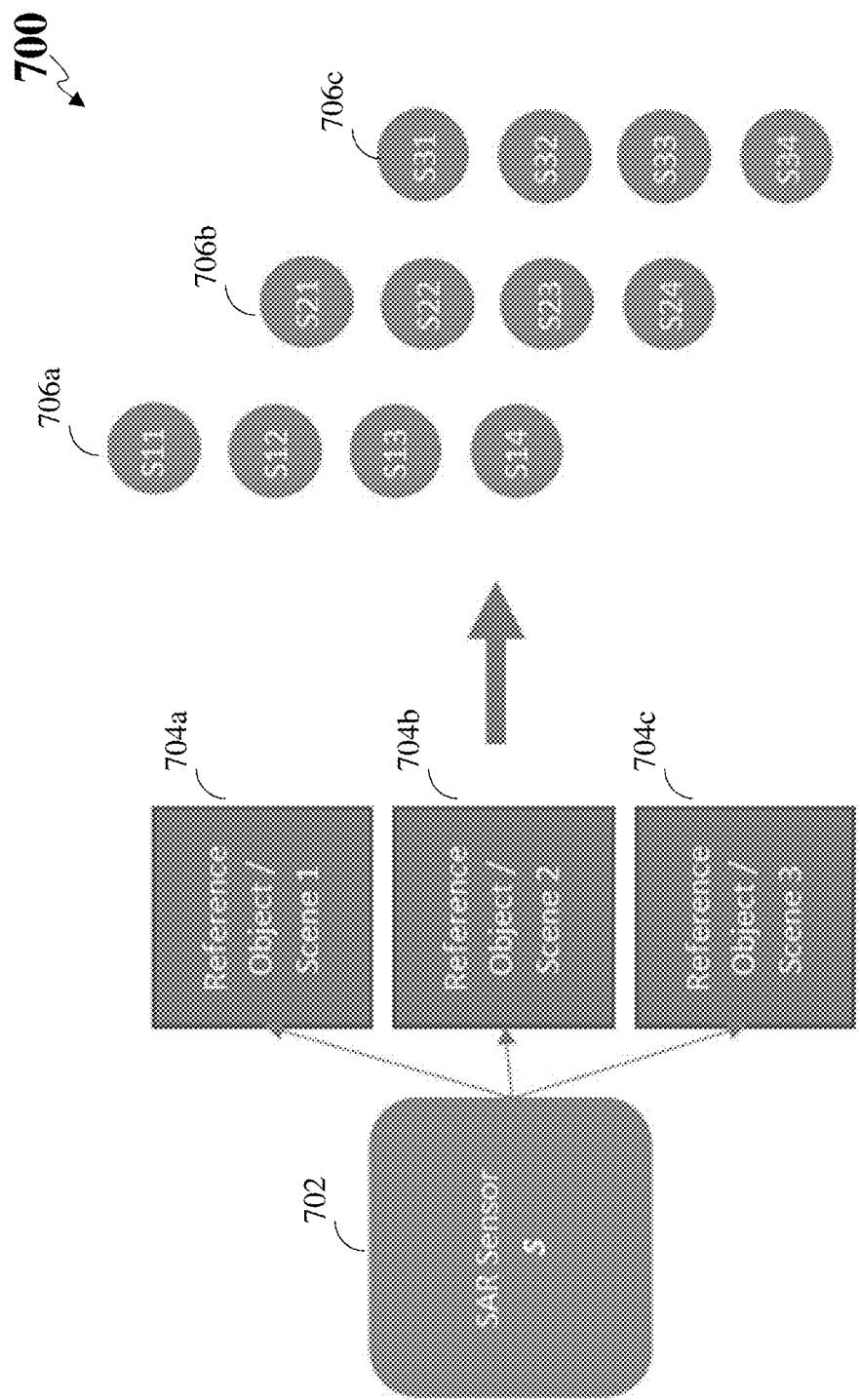
FIG. 7 illustrates an example of a first sensor data marked with reference objects/scenes, according to an embodiment.
Figure 8:
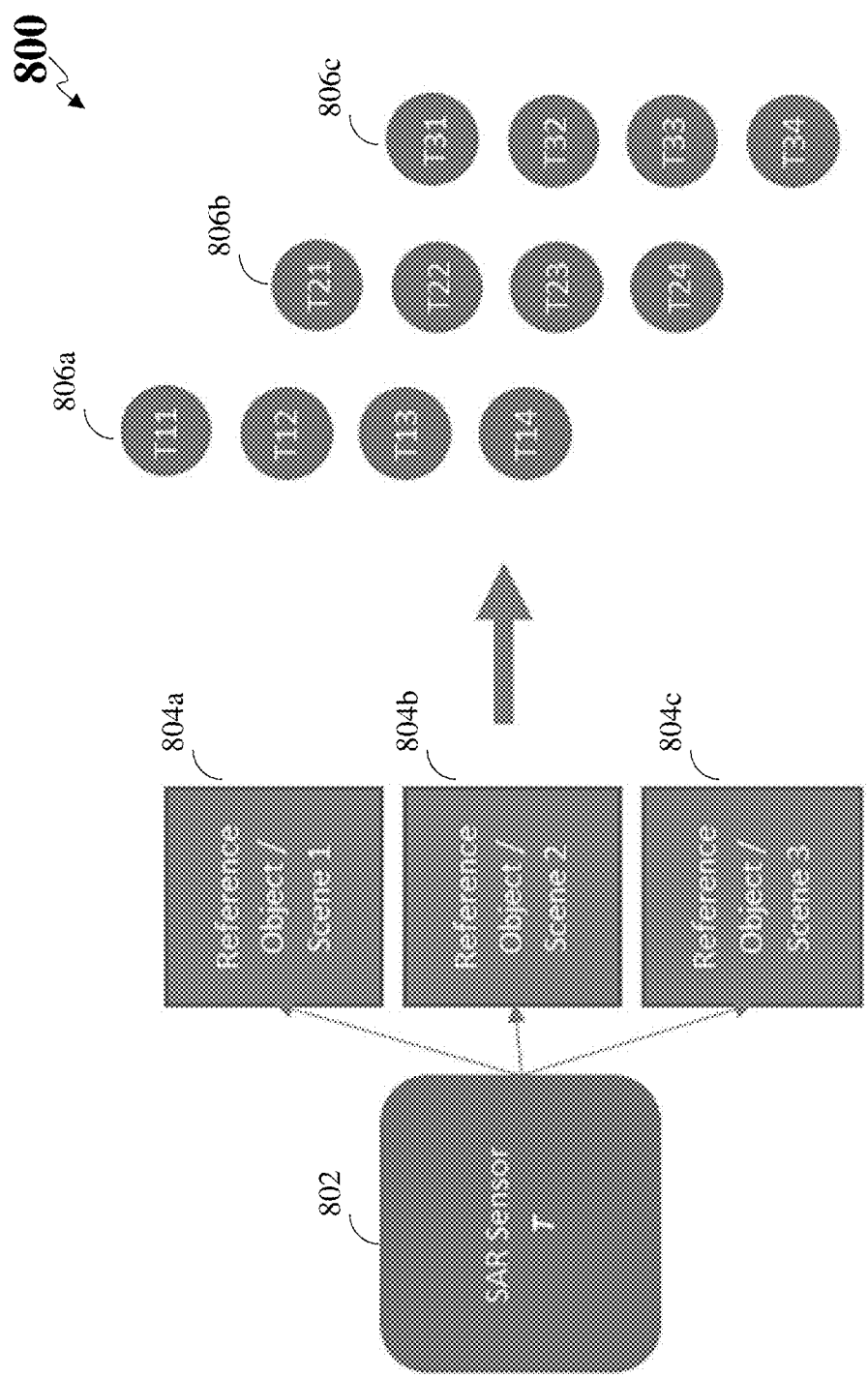
FIG. 8 illustrates an example of a second sensor data marked with reference objects/scenes, according to an embodiment.
Figure 9:
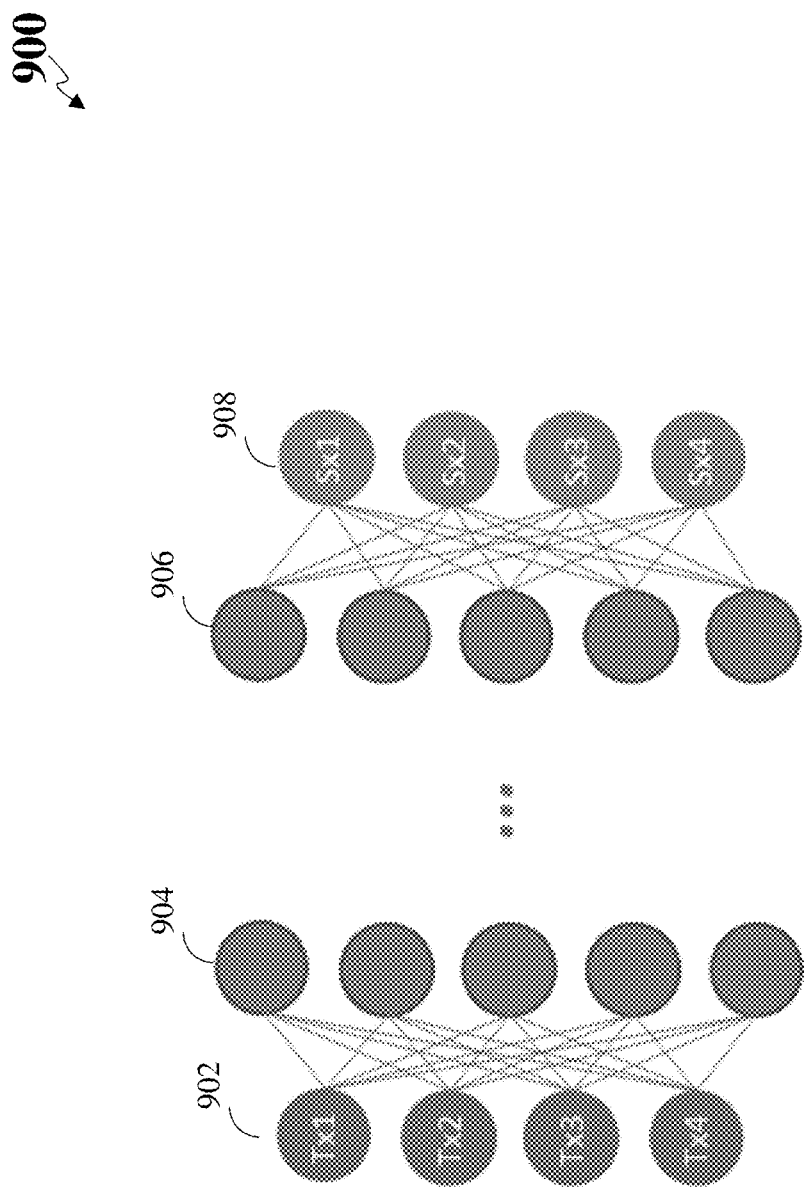
FIG. 9 illustrates an example of translating the second sensor data into the first sensor data based on reference objects/scenes, according to an embodiment.

In some other embodiments, the analytic server may use reference objects or reference scenes to translate the second SAR imagery data (T data) into the learned representations of the first SAR imagery data (S data). Specifically, the analytic server may require the S data and T data to be marked with reference objects/scenes. The reference objects/scenes may be data easily obtained or already available data to indicate the objects/scenes included in the imageries. For example, the reference objects/scenes may be a Ford Taurus scene, a golf course turf scene, a test center scene, or any other scene. With the reference objects/scenes available, the SAR imagery data may be categorized into several groups. The analytic server may determine the correspondence relationship between the S data groups and the T data groups based on the reference objects/scenes. Furthermore, the analytic server may translate the T data into S data by referring to the correspondence relationship. FIG. 7 illustrates an example of the S data marked with reference objects/scenes. FIG. 8 illustrates an example of the T data marked with reference objects/scenes. FIG. 9 illustrates an example of translating T data into S data based on reference objects/scenes.

Adding support for the new radar sensor T is fast and automatic, given unlabeled training data. In essence, the analytic server may wrap an autoencoder for the new sensor around the original autoencoder for S. The analytic server may perform unsupervised learning on the outer autoencoder while keeping the original autoencoder's weights fixed. The resulting neural network may quickly learn to translate T sensor data into learned representations of the original S sensor. Removing the last half of the neural network yields a T-to-learned representations translator, enabling direct use of the original classifier without retraining it.

At step 312, the analytic server may segment and classify the second SAR imagery using the classifier trained using labeled data on the first SAR imagery. As discussed above, the analytic server may translate the T data into the learned representations of the original S data. The analytic server may use the original classifier trained based on the S data to segment and classify the T data and determine the class values, such as the terrain types of the second SAR imagery. The analytic server may output and display the terrain types of the second imagery on a graphical user interface of the client computing device.

FIG. 4 illustrates an example of autoencoder 400 performing unsupervised learning to generate learned representations, according to an embodiment. The autoencoder may take SAR imagery as SAR input 402 for the autoencoder and perform unsupervised learning over the SAR input 402. The autoencoder may generate and output reduced dimensionality representations, learned representations 404. The SAR input may be unlabeled data. The output learned representations may be in less dimensions than the input. The autoencoder approach to dimensionality reduction is capable of making non-linear discriminations, provided there are a sufficient number of hidden layers.

FIG. 5 illustrates an example of classifier 500 based on supervised learning that maps learned representations to class values, according to an embodiment. The analytic server may perform a supervised learning step to train the classifier using training data with labeled terrain segments. In other words, the analytic server may require a batch of labeled training data on the first SAR imagery's terrain segments to train the classifier. The classifier may recognize specific terrain types from the learned representations 502 and output class values in class layer 504. The class values may be the recognized terrain types, such as road, forest, agriculture area, urban area, rural area, and the like.

FIG. 6 illustrates an example of a nested autoencoder 600 translating new sensor data into the learned representations of the original instrumentation, according to an embodiment. The analytic server may provide the ability to adapt to new types of radar sensors (e.g., sensor T) by translating the new sensor data into the learned representations of the original sensor (e.g., sensor S) with nested autoencoder. For example, the nested autoencoder may perform unsupervised learning on unlabeled training data of new sensor's SAR input 602 (e.g., T's SAR data). The analytic server may train the T autoencoder to reproduce the input for the S autoencoder 604. The analytic server may employ the neural network to learn how to cast T in terms of S's learned representations 606. After translating T data into learned representations of S data, the analytic server may reuse the original terrain classifier, effectively transferring the preexisting knowledge about SAR imagery to the new radar sensor type.

FIG. 7 illustrates an example of the first sensor data (S data) marked with reference objects/scenes 700, according to an embodiment. The SAR imagery from sensor S 702 may be marked with reference objects/scenes 704a, 704b, 704c. The analytic server may categorize the S data into different groups with each group corresponding to one reference object. For example, reference data 706a, including S11, S12, S13, and S14, may correspond to the first reference object/scene 704a. Similarly, reference data 706b, including S21, S22, S23, and S24, may correspond to the second reference object/scene 704b. Reference data 706c, including S31, S32, S33, and S34, may correspond to the third reference object/scene 704c.

FIG. 8 illustrates an example of the second sensor data (T data) marked with reference objects/scenes 800, according to an embodiment. The SAR imagery from sensor T 802 may be marked with reference objects/scenes 804a, 804b, 804c. The analytic server may categorize the T data into different groups with each group corresponding to one reference object. For example, reference data 806a, including T11, T12, T13, and T14, may correspond to the first reference object/scene 804a. Similarly, reference data 806b, including T21, T22, T23, and T24, may correspond to the second reference object/scene 804b. Reference data 806c, including T31, T32, T33, and T34, may correspond to the third reference object/scene 804c.

FIG. 9 illustrates an example of translating the second sensor data (T data) into the first sensor data (S data) based on reference objects/scenes 900, according to an embodiment. The T data (Tx1, Tx2, Tx3, Tx4, x=1, 2, 3) 902 may correspond to reference objects/scenes 904; the S data (Sx1, Sx2, Sx3, Sx4, x=1, 2, 3) 908 may correspond to reference objects/scenes 906. The reference objects/scenes 904, 906 may be the same scenes, thus providing the analytic server with information on which group of T data correspond with which group of S data. The analytic server may translate the T data 902 into the S data 908 based on the reference objects/scenes 904, 906.

Figure 10:
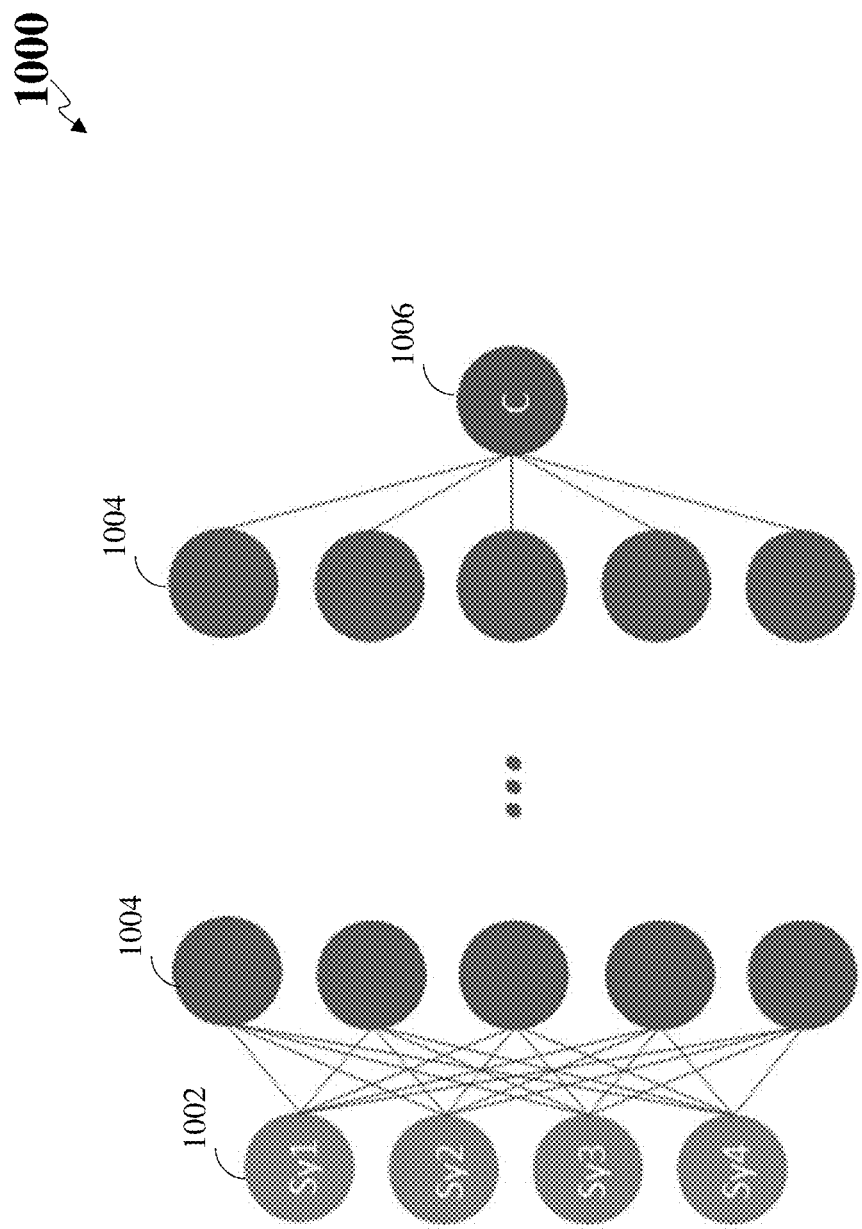
FIG. 10 illustrates an example of training an artificial intelligence model or artificial neural networks (ANN) model for the first sensor to identify terrain types, according to an embodiment.

FIG. 10 illustrates an example of training an artificial intelligence model or artificial neural networks (ANN) model for the first sensor (sensor S) to identify terrain types 1000, according to an embodiment. The analytic server may train the terrain classification ANN model based on labeled training data available for desired terrain types to be classified. The analytic server may use the SAR imagery data from sensor S 1002 as input and generate learned representations 1004. The analytic server may train the classifier 1006 using the training data with labeled terrain segments. The classifier may recognize the specific terrain types from the learned representations 1004. The terrain types may include road, forest, agriculture, urban, rural, and the like.

Figure 11:
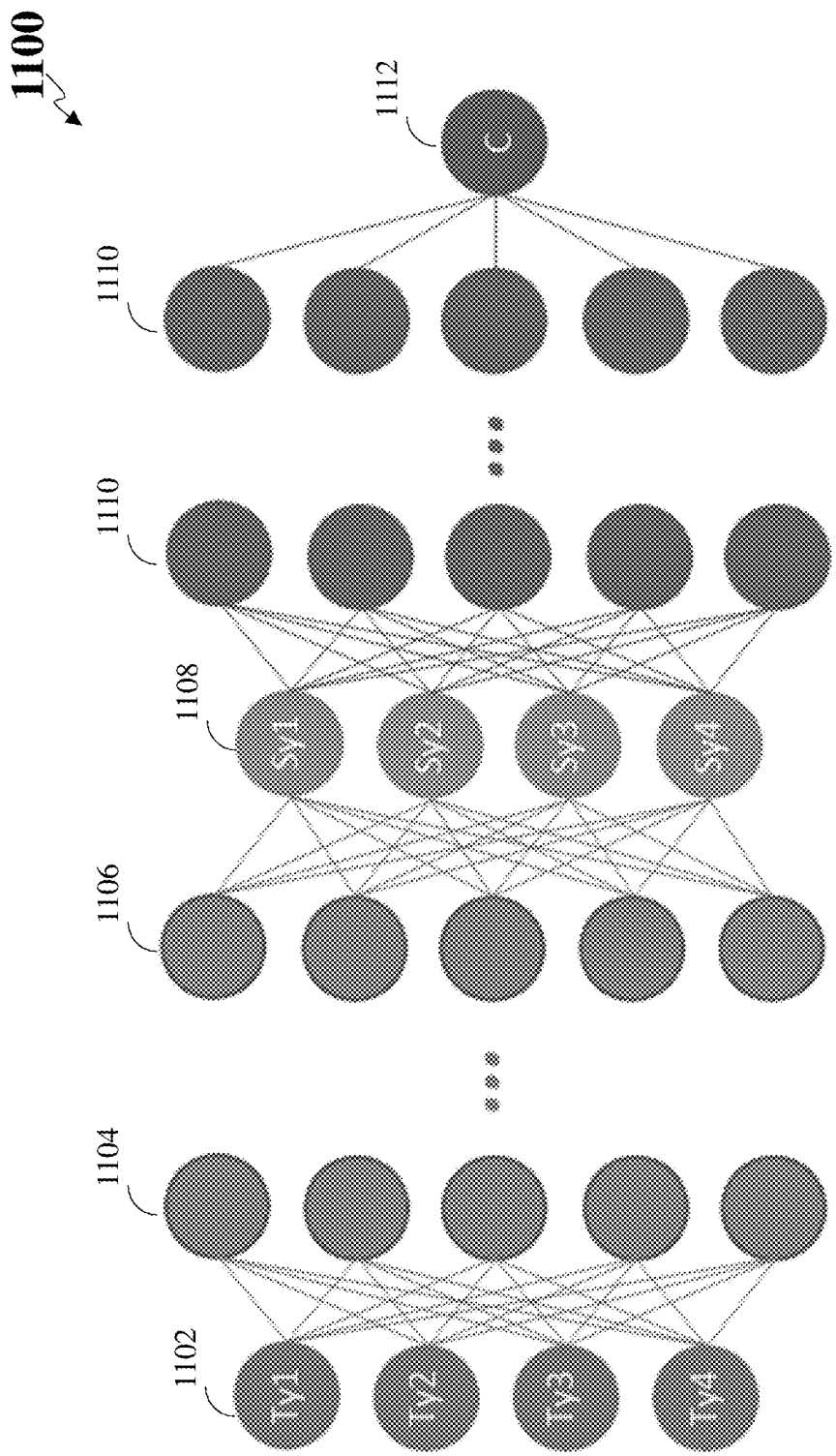
FIG. 11 illustrates an example of identifying terrain types in the second sensor data of real world objects/scenes, according to an embodiment.

FIG. 11 illustrates an example of identifying terrain types in the second sensor data of real world objects/scenes 1100, according to an embodiment. The analytic server may identify terrain types in the second sensor data by reusing the original terrain classifier trained for the first sensor (sensor S) without requiring SAR data to have comprehensive terrain labels for the second sensor (sensor T). Specifically, the analytic server may translate the sensor T's data 1102 to the sensor S's data 1108 based on their reference objects/scenes 1104, 1106. The sensor T's reference objects/scenes 1104 and the sensor S's reference objects/scenes 1106 may be the same. The analytic server may reuse the original terrain classifier 1112 trained for sensor S to determine the terrain type of sensor T's data. The original terrain classifier may recognize the specific terrain types from the learned representations 1110.

Figure 12:
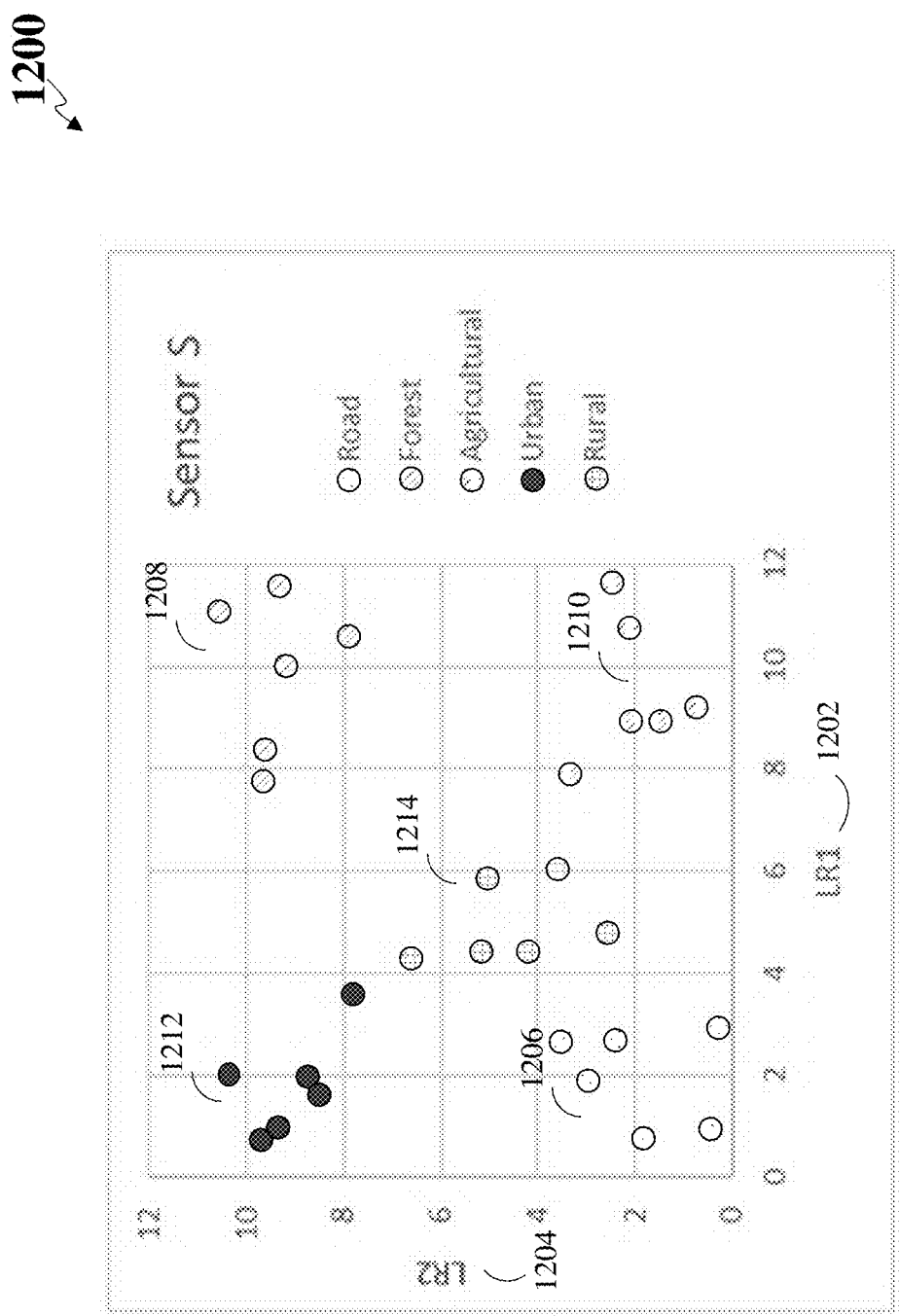
FIG. 12 illustrates an example of identified terrain types in the first sensor data, according to an embodiment.

FIG. 12 illustrates an example of identified terrain types in the first sensor data 1200, according to an embodiment. The analytic server may analyze the terrain-labeled learned representations of sensor S data to learn the number of terrain classes, class cluster centroid, and variance by class. In FIG. 12, the learned representations may have two dimensions, such as LR1 1202 and LR2 1204. The terrain types may have five classes, such as road 1206, forest 1208, agriculture 1210, urban 1212, rural 1214.

Figure 13:
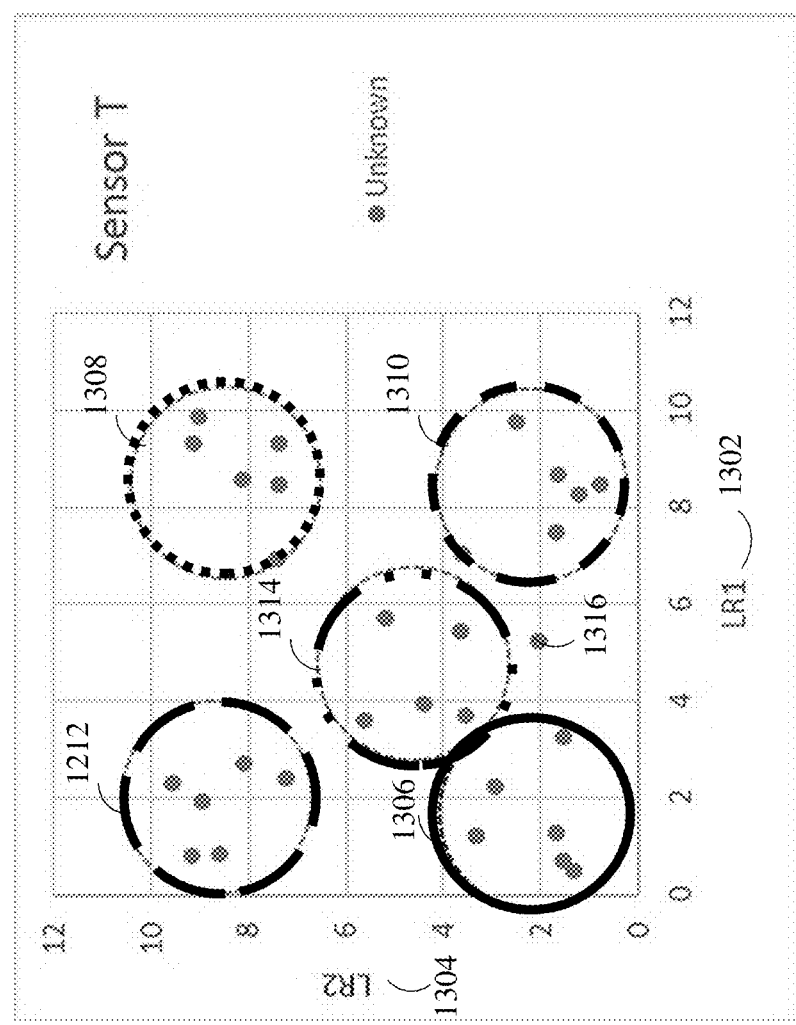
FIG. 13 illustrates an example of identified terrain types in the second sensor data, according to an embodiment.

FIG. 13 illustrates an example of identified terrain types in the second sensor data 1300, according to an embodiment. The analytic server may use the clustering information from the first sensor's (sensor S's) data to efficiently test hypotheses about possible correspondences between sensor S and sensor T learned representations. FIG. 13 shows an example indicating one clustering hypothesis for a given sensor T dataset. The analytic server may test the hypothesis by automatically labeling terrain types in radar images from sensor T and having an expert quickly perform a visual evaluation of the labeling accuracy. If the accuracy is low (e.g., smaller than a threshold value), the analytic server may test additional clustering hypotheses until the accuracy is sufficient (e.g., satisfying the threshold value). As the analytic server learns more inner-sensor correspondence relationships, the analytic server may find trends and make better guesses about the correct clustering hypothesis for new sensor data. As shown in the figure, the analytic server may classify the radar image from sensor T based on two dimensions, such as LR1 1302 and LR2 1304, and segment the radar image as five terrain types, such as road 1306, forest 1308, agriculture 1310, urban 1312, rural 1314, with one learned representation not identified 1316 and marked as unknown.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   receiving, by a computer, a first imagery from a first sensor device of a first device type, wherein the first imagery comprises an unlabeled dataset containing original imagery data obtained by the first sensor device;

training, by the computer, an autoencoder by performing unsupervised learning on the unlabeled dataset of the first imagery to generate learned representations of the first imagery;

training, by the computer, a classifier by performing supervised learning on a labeled dataset of the first imagery,
wherein the labeled dataset comprises terrain types data of the first imagery, and
wherein the classifier is configured to determine terrain types based on the learned representations of the first imagery;

translating, by the computer, a second imagery from a second sensor device of a second device type into the learned representations of the first imagery;

determining, by the computer, terrain types in the second imagery using the classifier trained for the first imagery, wherein the classifier segments and classifies the second imagery based on the translated learned representations of the first imagery; and displaying, by the computer, the terrain types in the second imagery on a graphical user interface.

2. The method of claim 1, wherein the first imagery and the second imagery are synthesis aperture radar imageries.

3. The method of claim 1, wherein the first imagery and the second imagery are from different radar sensors.

4. The method of claim 1, further comprising:
training, by the computer, the classifier using deep neural network algorithms.

5. The method of claim 1, wherein the autoencoder comprises hidden layers.

6. The method of claim 1, wherein the learned representations are in less dimensions than the unlabeled dataset of the first imagery.

7. The method of claim 1, wherein the first imagery and second imagery are marked with reference objects and reference scenes.

8. The method of claim 7, wherein the reference objects and reference scenes of the first imagery and the second imagery are the same.

9. The method of claim 7, further comprising:
translating, by the computer, the unlabeled dataset of the second imagery into the learned representations of the first imagery based on the reference objects and reference scenes.

10. The method of claim 7, wherein the reference objects and reference scenes provide a correspondence relationship between the first imagery and the second imagery.

11. A system comprising:
a first sensor device;
a second sensor device; and
a server in communication with the first and second sensor devices and configured to:
receive a first imagery from the first sensor device of a first device type, wherein the first imagery comprises an unlabeled dataset containing original imagery data obtained by the first sensor device;
train an autoencoder by performing unsupervised learning on the unlabeled dataset of the first imagery to generate learned representations of the first imagery;
train a classifier by performing supervised learning on a labeled dataset of the first imagery, wherein the labeled dataset comprise terrain types data of the first imagery, and wherein the classifier is configured to determine terrain types based on the learned representations of the first imagery;
translate a second imagery from the second sensor device of a second device type into the learned representations of the first imagery;
determine terrain types in the second imagery using the classifier trained for the first imagery, wherein the classifier segments and classifies the second imagery based on the translated learned representations of the first imagery; and
display the terrain types in the second imagery on a graphical user interface.

12. The system of claim 11, wherein the first imagery and the second imagery are synthesis aperture radar imageries.

13. The system of claim 11, wherein the first imagery and the second imagery are from different radar sensors.

14. The system of claim 11, wherein the server is further configured to:
train the classifier using deep neural network algorithms.

15. The system of claim 11, wherein the autoencoder comprises hidden layers.

16. The system of claim 11, wherein the learned representations are in less dimensions than the unlabeled dataset of the first imagery.

17. The system of claim 11, wherein the first imagery and second imagery are marked with reference objects and reference scenes.

18. The system of claim 17, wherein the reference objects and reference scenes of the first imagery and the second imagery are the same.

19. The system of claim 17, wherein the server is further configured to:
translate the unlabeled dataset of the second imagery into the learned representations of the first imagery based on the reference objects and reference scenes.

20. The system of claim 17, wherein the reference objects and reference scenes provide a correspondence relationship between the first imagery and the second imagery.

* * * * *